United States Patent
Bass et al.

(10) Patent No.: US 6,272,134 B1
(45) Date of Patent: Aug. 7, 2001

(54) MULTICAST FRAME SUPPORT IN HARDWARE ROUTING ASSIST

(75) Inventors: Brian M. Bass, Apex; Douglas R. Henderson, Raleigh; Edward Hau-chun Ku, Cary; Scott J. Lemke, Raleigh; Joseph M. Rash, Wake Forest; Loren Blair Reiss; Thomas Eric Ryle, both of Raleigh, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/975,231

(22) Filed: Nov. 20, 1997

(51) Int. Cl.⁷ .................................................. H04L 12/56
(52) U.S. Cl. ........................... 370/390; 370/401; 370/466
(58) Field of Search ..................................... 370/389, 390, 370/400, 401, 392, 473, 474, 466, 467, 475, 476, 404

(56) References Cited

U.S. PATENT DOCUMENTS

| 5,327,431 | | 7/1994 | Heske, III et al. . | |
|---|---|---|---|---|
| 5,361,256 | * | 11/1994 | Doeringer et al. ................... | 370/390 |
| 5,450,407 | | 9/1995 | Periman et al. . | |
| 5,459,719 | | 10/1995 | Hayashi . | |
| 5,602,841 | | 2/1997 | Lebizay et al. . | |
| 5,608,726 | * | 3/1997 | Virgile ................................ | 370/401 |
| 5,691,984 | * | 11/1997 | Gardner et al. ....................... | 370/401 |
| 5,787,084 | * | 7/1998 | Hoang et al. ......................... | 370/412 |
| 5,825,767 | * | 10/1998 | Mizukoshi et al. .................. | 370/395 |
| 6,031,838 | * | 2/2000 | Okabe et al. ......................... | 370/395 |

FOREIGN PATENT DOCUMENTS

| 0771131A2 | 5/1997 | (EP) . |
|---|---|---|
| 7030585 | 1/1995 | (JP) . |
| 9083576 | 3/1997 | (JP) . |

OTHER PUBLICATIONS

"Asynchronous Transfer Mode Cell Routing", IBM Technical Disclosure Bulletin, vol. 37, No. 04b, Apr. 1994, pp. 415–417.

"Designing Broadcasting Algorithms in the Postal Model for Message–Passing Systems", IBM Technical Disclosure Bulletin, vol. 35, No. 3, Aug. 1992, pp. 32–36.

"Fast Topology Update in Asynchronous Transfer Mode Networks", IBM Technical Disclosure Bulletin, vol. 38, No. 11, Nov. 1995, pp. 359–360.

* cited by examiner

Primary Examiner—Chau Nguyen
Assistant Examiner—Soon-Dong Hyun
(74) Attorney, Agent, or Firm—Matthew W. Baca

(57) ABSTRACT

A method and system are provided for increasing processing efficiency associated with data frames transiting a network node having multiple ports. The method and system accomplish their objects via the following. A data frame having a header and data is received. An associated pointer for at least one portion of the received data frame is provided. The associated pointer is provided by segmenting each received data frame into parts, and associating with each segmented part a pointer. Thereafter, a portion of the received data frame is modified independent of other portions of the received data frame via utilization of given one or more of the associated pointers. Additionally, one or more copies of a portion (which can include the whole) of the received data frame is constructed by recalling each segmented part associated with one or more selected ones of the associated pointers. Furthermore, a determination is made as to whether the received header indicates unicast or multicast. In response to this determination, a number of data frames are constructed commensurate with protocols and destination addresses of one or more network nodes to which the constructed number of data frames is to be transmitted. The constructed data frames are transmitted from the node.

20 Claims, 12 Drawing Sheets

Frame replicated without modifications and sent to multiple ports.

Frame replicated with header modified and sent to multiple ports.

Combination of frames replicated with and without headers modified and sent to multiple ports.

MULTICAST FRAME SUPPORT IN HARDWARE ROUTING ASSIST

BACKGROUND OF THE INVENTION

1. Technical Field

The present invention is related to a method and system to be utilized in data communications. In particular, the present invention is related to a method and system to be utilized in data communications involving at least one data communications network. Yet still more particularly, the present invention is related to a method and system, to be utilized in data communications involving at least one data communications network having at least one network node.

2. Description of the Related Art

Data communications is the transfer of data from one or more data sources to one or more data sinks that is accomplished (a) via one or more data links between the one or more sources and one or more sinks, and (b) according to a protocol. Weik, *Communications Standard Dictionary* 203 (3 ed. 1996). A data link is the means of connecting facilities or equipment at one location to facilities or equipment at another location for the purpose of receiving the data. Weik, Id. 206 (3 ed. 1996). A protocol, in communications, computer, data processing, and control systems, is a set of formal conventions that govern the format and control the interactions between two communicating functional elements in order to achieve efficient and understandable communications. Weik, id. 770 (3 ed. 1996).

A data communications network is the interconnection of three or more communicating entities (e.g., data sources and/or sinks) over one or more data links. Weik, Id. 618 (3 ed. 1996). The branch of science and technology that is devoted to the study and analyses of the configurations and properties of networks makes use of what are known as network topologies. Weik, Id. 622 (3 ed. 1996). A network topology is typically a graphical representation of the specific logical arrangement, from a communications standpoint, of elements in a network, irrespective of such network elements' actual physical connection. In the art and science of network analysis, different networks are distinguished by their different network topologies.

In network topology, each communicating entity in a network is depicted as a graphical point, or node. These nodes are abstract representations of locations in an actual physical network at which one or more data transmission lines are interconnected. Weik, Id. 622 (3 ed. 1996).

There are multitudinous known network topologies (e.g. mesh, star, fully connected, etc., and hybrids of such known network topologies). One such well-known network topology is the star network topology, which can be utilized to illustrate a problem that exists generally in the field of data communications involving networks having nodes.

A star network topology is a radial (starlike) configuration of communications network nodes such that (a) each endpoint node is connected via a single branch directly to the central node that serves as a central distribution node, and (b) each endpoint node can communicate with any other node only via the central node and two branches. The central node serves as a distribution node to all the endpoint nodes, including the originating node, or to selected endpoint nodes, depending upon whether the central node is an active or passive node. Weik, Id. 625 (3 ed. 1996).

FIG. 1 illustrates a star network topology. Shown is central node 100. Connected to central node 100 are endpoint nodes 102–116. These endpoints are connected to central node 100 via data links 122–136, respectively. The topology of the network makes clear that all communications between endpoints must transit central node 100.

In operation, central node 100 receives packetized data (in its most generic sense packetized data typically consists of a message field, a source field indicates the source node of the packetized data, and a destination field indicates the destination node (or data sinks) of the packetized data) from endpoint nodes 102–116 over their respective data links. Upon reception of such packetized data, central node 100 reads the destination field, determines which data link or links the packetized data must be sent over to reach the destination indicated in the destination field, and then subsequently sends the packetized data over the appropriate data link or links. Central node 100 must do the foregoing (receive the packetized data, read the destination field, and then transmit the packetized data over the appropriate link) for each unit of packetized data received.

If central node 100 is to send the data over only one data link, central node 100 is said to be engaging in "unicast" (i.e., transmitting the packetized data unit to only one ("uni") station). If central node 100 to send the data over more than one data link, central node 100 is said to be engaging in "multicast" (i.e., transmitting the packetized data unit to multiple ("multi") data stations).

In the event that a packetized data unit is addressed to one or more destination nodes which utilize the same data link protocol (i.e., "speak the same language") as the source node for the packetized data unit, central node 100 need merely receive the packetized data unit from the source node and transmit copies of it to the one or more destination nodes. This function is typically referred to as "bridging," because what the node is actually doing is serving as a "bridge" between two logically connected nodes (i.e., nodes utilizing the same protocol) which just happen to be physically disconnected.

In the event that a packetized data unit is addressed to one or more destination nodes which utilize different data link protocol(s) (e.g., do not "speak the same language") as a source node of each and every packetized data unit, then it is necessary for central node 100 to serve as a "translator" and make sure that each packetized data unit is modified such that it utilizes the protocol appropriate to the destination node to which it is destined. Thus, in this instance central node 100 engages in protocol translation and attendant packetized data modification prior to the frame being transmitted from the node over a particular data link. This function is typically referred to as "routing," because what the node is actually doing is serving to "route" packetized data units between two physically and logically (e.g., nodes that do not utilize the same protocol) disconnected nodes.

The foregoing discussion has utilized a central node in a star network to illustrate points common to all network nodes connecting three or more other network nodes (i.e., for each node in a network central to three or more other nodes). Those common points are that for each such node connecting three or more other nodes, in order to function effectively such central node, upon receipt of a packetized data unit that is to be transmitted through the central node, must: (1) determine whether the packetized data unit is to be unicast or multicast (i.e., must determine the data link or links over which the packetized data unit must be transmitted); (2) produce a copy of the packetized data with respect to each data link over which the packetized data unit is to be transmitted; (3) with respect to each copy of the packetized data unit which is to be transmitted, determine if protocol translation for such copy is necessary prior to the packetized data unit being transmitted from the node; and (4) after any necessary protocol translation and attendant packetized data unit modification, transmit a copy of the packetized data over each data link appropriate to the destination of the copy.

The foregoing dealt with the circumstance wherein only one source node was attempting to transmit to one or more destination nodes. It is common for several end stations to desire to communicate with other end stations virtually simultaneously. In such situations, central node 100 is called upon to do all the foregoing functions for several different discrete packetized data units.

In old-style nodes performing the foregoing noted functions which were illustrated via reference to central node 100, the foregoing noted functions were achieved by buffering (placing in temporary storage) one or more of the packetized data units, and then processing the stored data units one at a time. Another way to state this is that the packetized data units arriving virtually simultaneously were enqueued (made to wait in line) and would only be processed after the packetized data units ahead of them in the queue had been processed. That is, the four different logical steps noted above (i.e., determination of unicast/multicast, copy packetized data unit(s), engagement in any necessary protocol translation, and subsequent transmission of all the copies from the node over the appropriate data links) were engaged in for one particular packetized data unit, and after such processing was completed, the next data unit in the queue was attended to.

This need for enqueuing arose from the fact that in old-style nodes there was only one processor (or "thinker"), and that processor could only process on one packetized data unit at a time. Thus, if more than one packetized data unit appeared at central node 100 virtually simultaneously, many of such packetized data units would have to "wait their turn" until the processor was able to process them.

As network data traffic has increased, it has been found that such enqueuing and sequential processing has began to result in unreasonable communication delays (i.e., the wait in line, or in the "queue," became too long for the communications needs of particular endpoint nodes to be satisfied). However, as has been noted, such a wait is inherent in the very nature of a network node, when such network node is both unicast and multicast capable.

It is desirable to preserve the ability of network nodes to engage in both unicast and multicast. However, it is also desirable to decrease the latency (waiting) experienced by packetized data units transiting such a unicast and multicast capable node.

In light of the foregoing, it is apparent that a need exists for the present invention: a method and system to increase the efficiency of packetized data unit transmission through network nodes.

SUMMARY OF THE INVENTION

It is therefore one object of the present invention to provide a method and system to be utilized in data communications.

It is therefore another object of the present invention to provide a method and system to be utilized in data communications involving at least one data communications network.

It is yet still anther object of the invention to provide a method and system to be utilized in data communications involving at least one data communications network having at least one network node.

The foregoing objects are achieved as is now described. A method and system are provided for increasing processing efficiency associated with data frames transiting a network node having multiple ports. The method and system accomplish their objects via the following. A data frame having a header and data is received. An associated pointer for at least one portion of the received data frame is provided. The associated pointer is provided by segmenting each received data frame into parts, and associating with each segmented part a pointer. Thereafter, a portion of the received data frame is modified independent of other portions of the received data frame via utilization of given one or more of the associated pointers. Additionally, one or more copies of a portion (which can include the whole) of the received data frame is constructed by recalling each segmented part associated with one or more selected ones of the associated pointers. Furthermore, a determination is made as to whether the received header indicates unicast or multicast. In response to this determination, a number of data frames are constructed commensurate with protocols and destination addresses of one or more network nodes to which the constructed number of data frames is to be transmitted. The constructed data frames are transmitted from the node.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
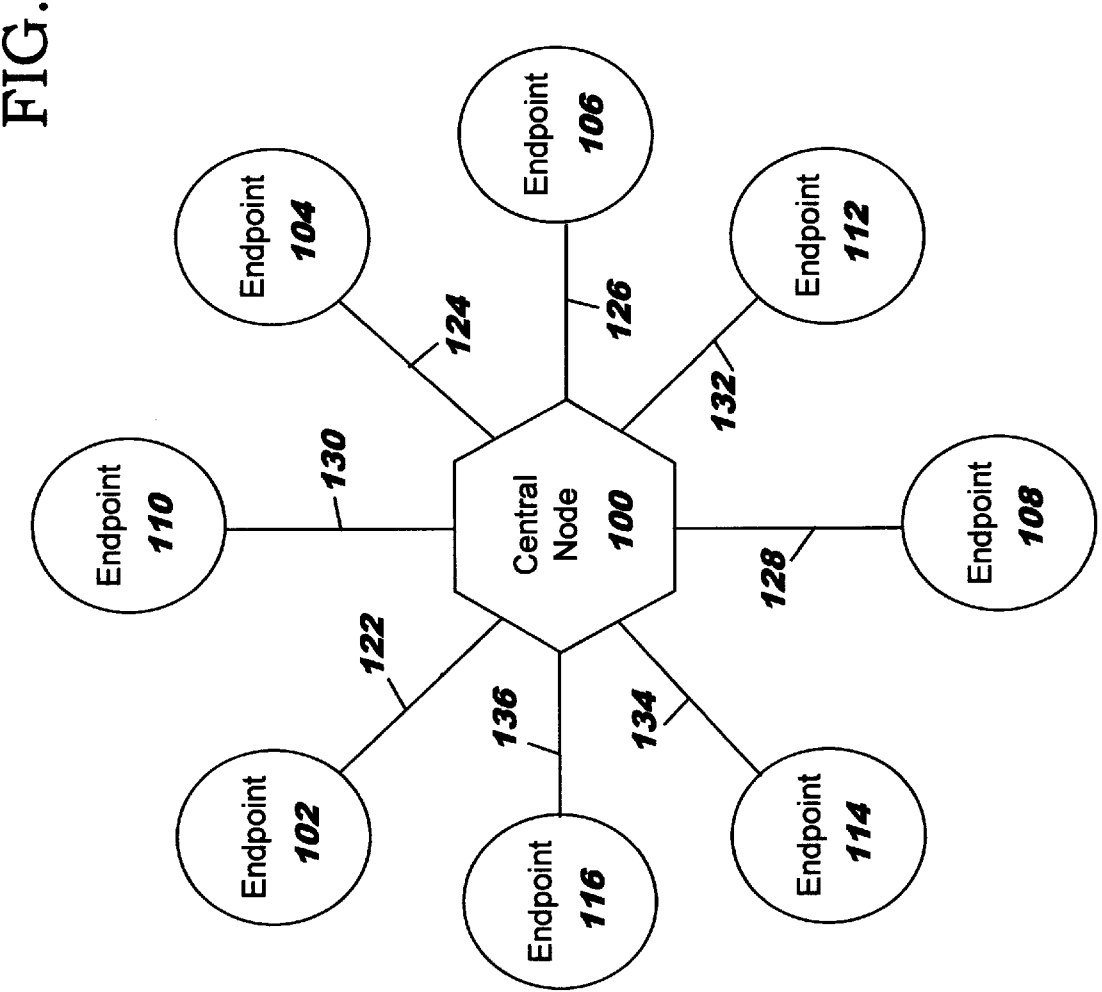
FIG. 1 illustrates a star network topology.

In the following detailed description, like parts are indicated by like numbers. Furthermore, the first digit of each reference numeral generally relates to the figure wherein the primary description of that reference numeral appears. For example, 1xx would have its primary description in relation to FIG. 1, 2xx in relation to FIG. 2, 3xx in relation to FIG. 3, and so forth.

The need for high performance network devices continues to increase. This need is driving network product designers to support more functions at the hardware level. One of these functions being driven to the hardware level is network bridge/routing. There are many problems associated with performing bridge/routing in hardware. One such problem discussed in this disclosure is that of supporting multicast and unicast frames.

A "frame" is a type of packetized data unit, and in a data transmission system, is a sequence of contiguous bits that can be bracketed by beginning and ending flag sequence and which typically contains one or more destination fields and at least one source field. A unicast frame is a single frame that is forwarded to a single destination network port. A multicast frame is a frame that is replicated and sent to multiple destination network ports. This replicated frame can be an exact duplicate of the same frame, a modified form of the original, or a combination of these. An example of where this concept is used would be in a network device supporting IP (Internet Protocol) multicast where the device has output ports supporting different lower level protocols such as Token Ring, Ethernet, and ATM (Asynchronous Transfer Mode). In this case, an IP multicast frame could come in on a port, and need to be multicast and sent out on several of the output ports. A unique version of the frame would need to be created for each lower level protocol, and multiple copies of each unique version would need to be created for each output port associated with the protocol that the frame would need to be transmitted on.

Figure 2:
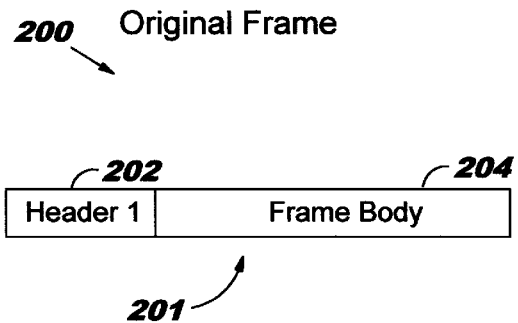
FIG. 2 illustrates different forms of multicast frames to be operated upon by one embodiment of the present invention.
Figure 2:
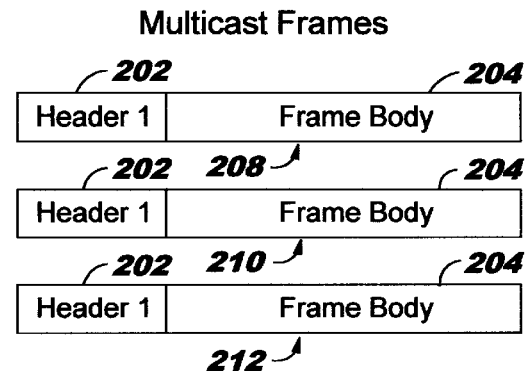
Figure 2:
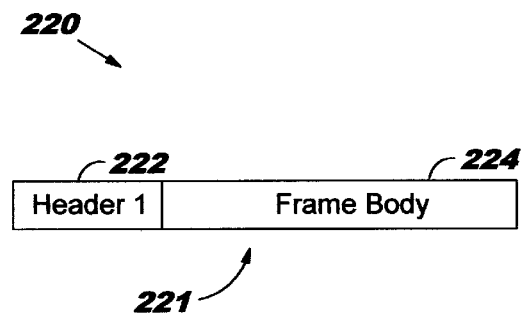
Figure 2:
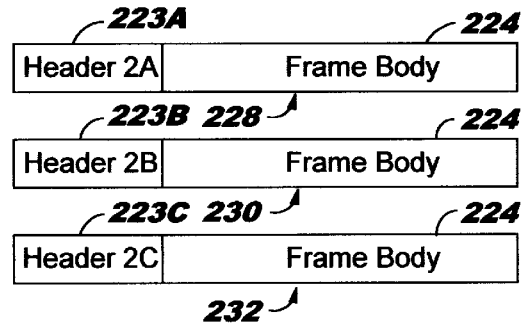
Figure 2:
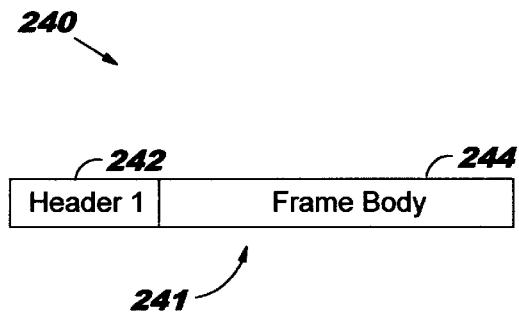
Figure 2:
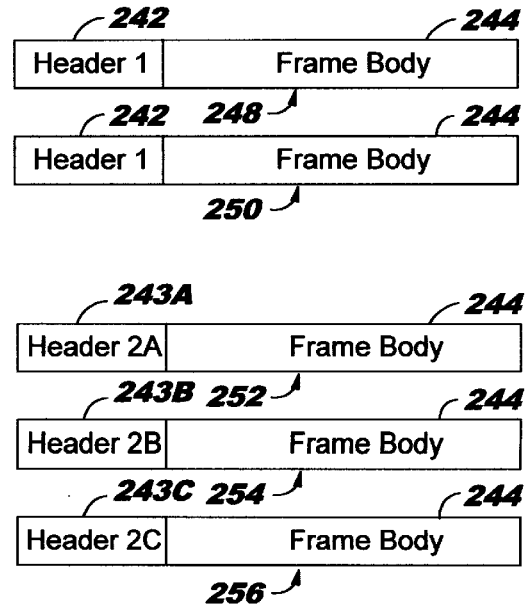

Refer now to FIG. 2. FIG. 2 illustrates different forms of multicast frames to be operated upon by one embodiment of the present invention. Scenario 200 illustrates the form of multicast in which an exact duplicate of an original received frame is multicast (such as in a multicast operation involving bridging between two physically disconnected networks utilizing the same protocols). Original received frame 201 has header 202 and frame body (or data) 204. Shown in scenario 200 is that multicast frames 208, 210, and 212 are composed of exact duplicates of header 202 and frame body (or data) 204.

Scenario 220 illustrates the form of multicast in which a header of an original received frame is modified before the frame is multicast (such as in a multicast operation involving routing between two physically disconnected networks utilizing different protocols). Original received frame 221 has header 222 and frame body (or data) 224. Shown in scenario 220 is that multicast frames 228, 230, and 232 are composed of modified headers 223A, 223B, and 223C (wherein each modified header is different from the other modified headers and different from header 222) and unmodified frame body (or data) 224.

Scenario 240 illustrates the form of multicast in which a header of an original received frame is modified before the frame is multicast (such as in a multicast operation involving both a bridging operation between two physical disconnected networks utilizing the same protocol and a routing operation between two physically disconnected networks utilizing different protocols). Original received frame 241 has header 242 and frame body (or data) 244. Shown in scenario 240 is that multicast frames 248, and 250 are composed of unmodified header 242 and unmodified frame body (or data) 244. Also shown is that multicast frames 252, 254, and 256 are composed of modified headers 243A, 243B, and 243C (wherein each modified header is different from the other modified headers and different from header 242) and unmodified frame body (or data) 244.

As has been discussed, in addition to the use of this function in hardware routing assist, this function is also performed at the network bridging layer. In network devices implementing a multicast function, it is possible for a single frame to be replicated hundreds of times. For this reason, it is extremely important for the method of implementing this function to be efficient in terms of both processing time, and memory utilization.

An illustrative embodiment of the present invention is addressed to the foregoing cited problems related to the ability of network nodes to support multicast and unicast frames in hardware in a way that is fast, efficient, and network protocol independent. This includes how a frame is represented internally and how it is replicated in hardware (if required). This disclosure does not attempt to solve the problem of determining whether a frame is a multicast frame, and specifically what the modified frame data or header should look like. Rather, this disclosure sets forth a general solution to the above-referenced problems, which may be applied across a wide range or protocols, including, but not limited to Token Ring, Ethernet, Asynchronous Transfer Mode Protocol, etc.

Figure 3:
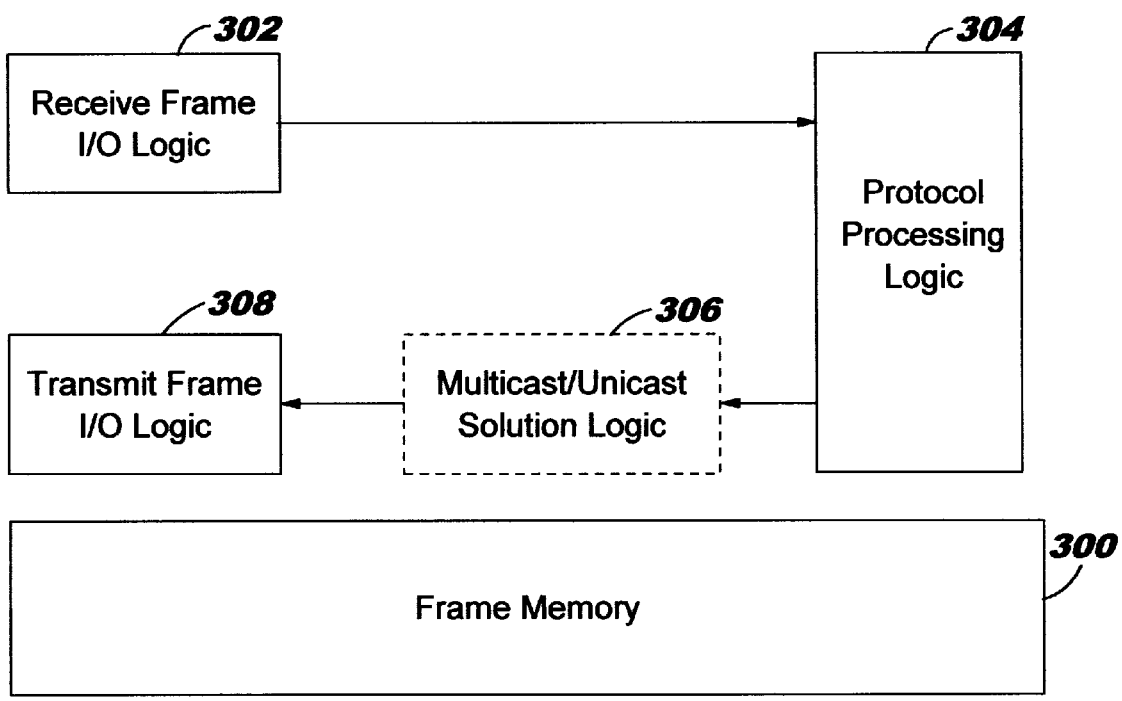
FIG. 3 illustrates a high level architecture of a device that supports multicast and unicast frames in hardware in accordance with an illustrative embodiment of the present invention.

FIG. 3 illustrates a high level architecture of a device that supports multicast and unicast frames in hardware, in accordance with an illustrative embodiment of the present invention. Frame memory 300 is where unicast and multicast frames are stored while being operated on by this device. Receive frame I/O logic 302 is responsible for receiving the frame from some external network port and storing the frame in frame memory. The protocol processing logic 304 is responsible for determining if a frame is unicast or multicast, modifying the frame network header if it is required to do so, and determining which output port the frame is sent to. The multicast/unicast solution logic 306 is responsible for replicating frames where an exact copy of the same frame are transmitted to multiple ports, replicating frames where unique copies of the frame is transmitted to multiple ports, and supporting frames where only one copy is sent to a port. The transmit frame I/O logic 308 is responsible for actually transmitting the frames in frame memory to the external network ports. The function of each of the foregoing cited parts will be discussed in more detail below.

There are several issues, or problem constraints, generated by the multicast problems, set forth in the background section, that should be taken into account in order for the solution to such problems to be optimal. These issues, or constraints, are as follows. First, the solution should have decreased impact on the performance of a unicast frame; that is, a unicast frame should pass through the multicast/lunicast solution logic with minimal latency. Second, the solution should decrease the effort required by hardware to replicate frames where the exact copies of each frame are sent to each network port. Third, the solution should decrease the effort required by hardware to replicate frames where the unique copies of each frame are sent to each network port. Fourth, the solution should efficiently utilize the memory available for the product.

How an illustrative embodiment solves the above-cited problems, in a fashion that takes into account the foregoing constraints, will now be set forth.

The problem of multicasting a network frame in hardware is made up of two parts. The first part is how the frame will be represented internally. The second part relates to how multicasting of the frame will actually be performed if such is required. Accordingly, the following discussion first sets forth how an illustrative embodiment of the present invention represents the frames internal to a node; thereafter, how multicasting is actually performed within an illustrative embodiment will be discussed.

The first part of the solution to the above-cited problems relates to how frames, received by a network node, are represented internal to the node. In the present invention, frames are represented using a series of data structures. These data structures are as described below. Those skilled in the art will recognize that additional fields can be optionally added for specific applications of an illustrative embodiment of the present invention.

With respect to how the present invention represents received frames are represented internal to a network node, there are five data structures of interest: (1) a Frame Buffer; (2) a Buffer Parameter Vector; (3) a Frame Parameter Vector; (4) a Master Frame Parameter Vector; and (5) a Multicast Group Table. These data structures, and how they function within the preferred invention, can be described as follows.

The first data structure discussed will be the Frame Buffer data structure. A Frame Buffer data structure is a data buffer location of a predetermined (e.g., 64 bytes) size that is used to store all or part of a received network frame. The size of these data buffers can be selected such that the buffers are large enough to contain a frame header and small enough to avoid wasting memory resources. The predetermined size of these data buffers is within the purview of the designer and will vary dependent upon the structure of the frames to be transmitted through a network node and the capabilities of the actual hardware, software or firmware in which the Frame Buffer data structures are implemented. These frame buffers can be chained together using Buffer Parameter Vectors (BPVs), in order to completely buffer any frame.

A Buffer Parameter Vectors (BPV) data structure is a data structure used to chain multiple frame buffers together in order to create a virtual buffer large enough to store an entire frame (assuming that a Frame Buffer is of a size smaller than a frame to be stored). There is a one to one correspondence between BPVs and Frame Buffers. The BPV data structure is made up of the following fundamental fields: (1) a Next BPV field, which is a pointer to the next BPV in a chain of BPVs; and (2) an FB-Ptr (Frame Buffer-Pointer) field, which is a pointer to the frame buffer that a given BPV is associated with. Those skilled in the art will note that since there is a one to one relationship between BPVs and Frame Buffers, this (FB-Ptr) field is not necessarily needed for implementation purposes. As will be understood by those skilled in the art, one could use an index to address the BPVs, and the same index to address buffer pointers.

The next data structure of interest is the Frame Parameter Vector data structure. A Frame Parameter Vector (FPV) data structure is used along with a Master Frame Parameter Vector (MFPV) data structure (described below) to manage a frame as it flows through a specific network node. There is one FPV required for each unique version of a frame. Therefore, in the case of a unicast frame, only a single FPV is required, and in the case of multicast frames, multiple FPVs may be required. Its (the FPV's) primary purpose is to provide access to the first Frame Buffer (which, in an illustrative embodiment of the present invention, is typically the header buffer) of a frame, and provide a means of managing multiple versions of the same frame. The FPV data structure is made up of the following fundamental fields: (1) a Parent Pointer field, which is a pointer to the parent data structure for this FPV (in an illustrative embodiment, this parent data structure can be either a MFPV or another FPV); (2) a First BPV data structure field, which is a pointer to the first BPV of the frame represented by this FPV (in an illustrative embodiment, the frame buffer pointed to by this first BPV contains the frame header); (3) a Child Count data structure field that is the count of the number of FPVs that point to the parent FPV; and (4) a "flag" field which contains a multiple copies "complete" flag and a "parent type" flag.

The next data structure of interest is the Master Frame Parameter Vector (MFPV). A Master Frame Parameter Vector (MFPV) data structure is used along with a Frame Parameter Vector (FPV) to manage a frame as it flows through a particular network node. There is one MFPV for each frame that is received by a particular network node. The purpose of the MFPV is to hold global information about a frame. Each MFPV has from 1 to n child FPVs that all point back to it. For an inbound frame, and a unicast outbound frame, there will only be a single FPV pointing back to the MFPV. For the multicast case, there can be any number of FPVs that all point back to this MFPV. The fields that make up the MFPV are all implementation specific; however, irrespective of the implementation, all MFPVs contains: (1) a Child Count field that is the count of the number of FPVs that point to the parent MFPV; (2) a "flag" field which contains a modified header "complete" flag; (3) a Second BPV data structure field, which is a pointer to the second BPV of the frame represented by the MFPV; and (4) a Last BPV data structure field which is a pointer to the last BPV of the frame represented by the MFPV. For the purposes of an illustrative embodiment of the present invention, the MFPV exists strictly as a common data structure relating all versions of the same multicast frame to each other.

The last data structure of interest in one illustrative embodiment of the present invention (those skilled in the art will appreciate that many more data structures than those listed herein could be practiced within the context of the present invention disclosure) is the Multicast Group Table (MGT) data structure. The Muiticast Group Table (MGT) is a data structure that is used to specify which output ports a multicast frame is to be transmitted to. The MGT is made up of some number of Multicast Groups. (A "multicast group" is a group of communication entities that are identified by a routing address that is used to simultaneously address all the computers in the group; that is, a frame addressed to a multicast group should result in a copy of such a frame being transmitted to each member in the defined group.) Each group is represented by an entry in this table. Each Multicast Group entry specifies which output ports a frame associated with the Multicast Group must be transmitted to. Each output port is represented by a bit in the Multicast Group entry. If the bit position for a given output port is set, the frame will be transmitted to that output port. While, the Multicast Group Table has been herein described as a bit map onto the ports, it will be understood by those within the art that any data structure could be utilized to achieve the same functionality.

It was mentioned above that a solution to the problems noted in the background section was composed of two parts: defining certain data structures of interest, and specifying how those data structures could be utilized to frame multicast in a fashion that does not unduly impact unicast. How the foregoing defined data structures are utilized in one illustrative embodiment of the present invention to do such will now be addressed.

An illustrative embodiment of the present invention utilizes the data structures, defined above, to provide an optimal solution to the above-cited problems associated with nodes engaging in unicast and multicast. One illustrative embodiment provides such solution by defining the following: (1) how a unicast frame is handled; (2) how unique copies of the a frame are handled; (3) how multiple copies of the same unique frame are handled; (4) how combinations of unique frames and copies of the same frame are handled. The following discussion will discuss each of the foregoing in turn. Following such discussion, summary flow charts will be set forth illustrating how all these concepts can fit together in a single flow.

Figure 4:
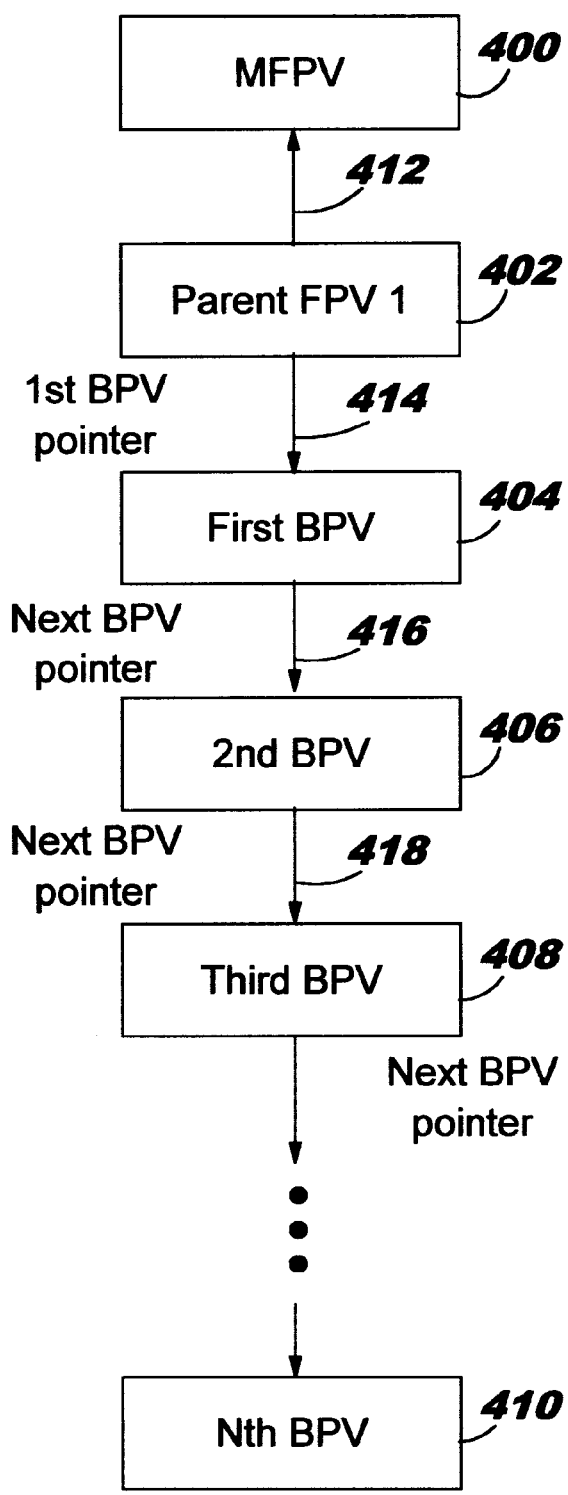
FIG. 4 illustrates how a unicast frame is represented using an illustrative embodiment of the present invention.

Refer now to FIG. 4. FIG. 4 depicts how unicast frames are handled in an illustrative embodiment utilizing the above-defined data structures. Unicast frames are first built by Receive Frame I/O Logic 302 as a frame is received by a device implementing an illustrative embodiment of the present invention. A unicast frame is built in frame memory using the above-defined data structures.

FIG. 4 illustrates how a unicast frame is represented using an illustrative embodiment of the present invention. As shown in FIG. 4, when a frame is received, Receive Frame I/O Logic 302 builds an initial structure composed of MFPV, an FPV, and a BPV which are then utilized to manipulate the received data frame. FIG. 4 illustrates how an MFPV, an FPV, and one or more BPVs are utilized. Shown in FIG. 4 is that MFPV 400 is created, which as discussed above, is utilized to hold global information about a frame. Since it has been determined that the frame is to be unicast, there is one FPV 402 associated with MFPV 400. FPV 402 has a parent pointer field, graphically illustrated as pointer 412, which points to MFPV 400 with which FPV 402 is associated; FPV 402 also has a first BPV data structure field, graphically illustrated as pointer 414, which points to first BPV 404. First BPV 404 has a next BPV field, graphically illustrated as pointer 416, which points to second BPV 406; first BPV 404 also has an FB-PTR (Frame Buffer-Pointer) field (not shown) which actually points to the location where the actual portion of a received frame, associated with first BPV 404, is stored (the FB-PTR field allows a BPV to be used to manipulate actual received frame contents).

Second BPV 406 has a next BPV field, graphically illustrated as pointer 418, which points to third BPV 408; BPV also has an FB-PTR (Frame Buffer-Pointer) field (not shown) which actually points to the location where the actual portion of a received frame, associated with second BPV 406, is stored (the FB-PTR field allows a BPV to be used to manipulate actual received frame contents).

As can be seen from FIG. 4, as more true buffer space is required by the inbound frame, the receive frame I/O logic 302 can create a larger virtual buffer by adding on more buffers using BPVs. This fact is illustrated by showing that the chain could extend, in the fashion discussed previously, all the way to an Nth BPV 410 (where N is some positive integer value).

Although not expressly shown in FIG. 4, it is to be understood that when a frame is received, the protocol processing logic 304 will determine if a frame is to be multicast or not, and if the frame header needs to be modified. If a frame is not to be multicast, the protocol processing logic 304 will modify the frame header (if required), and instruct the multicast/unicast logic that this frame is not a multicast frame. Accordingly, the multicast/unicast logic will not modify the unicast frame data structures, but will instead instruct the transmit frame I/O logic 308 to transmit the frame "as is" (i.e., unmodified) to the appropriate port.

Figure 5:
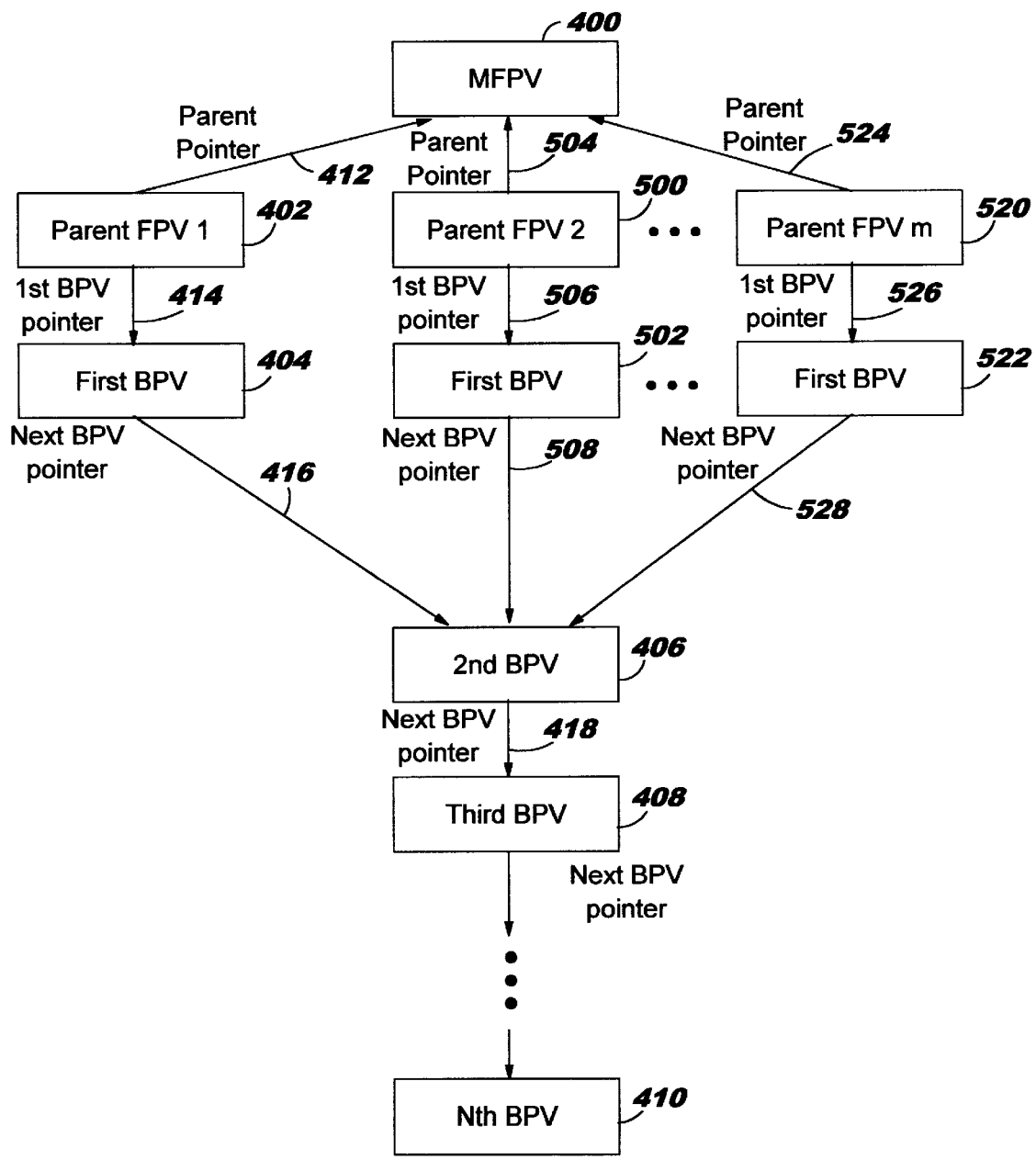
FIG. 5 illustrates how multicast frames requiring unique copies of frame headers are handled in an illustrative embodiment of the present invention.

Refer now to FIG. 5. FIG. 5 illustrates how multicast frames requiring unique copies of frame headers are handled in an illustrative embodiment of the present invention. When the protocol processing logic 304 determines that a frame is to be multicast, and several unique header copies of the same frame are required, the multicast/unicast solution logic 306 and the protocol processing logic 304 work together to build these frames.

Shown in FIG. 5 is that, for each needed unique version of the frame the multicast/unicast solution logic 306 will create a new parent FPV and first BPV to hold the new unique header for that frame. The parent pointer field of the FPV will be assigned to point to the MFPV of the original frame, and the next BPV field of the new first BPV will point to the second BPV of the original frame. The Protocol Processing Logic modifies the frame header in the new first BPV. This process of creating new FPVs, and BPVs and modifying the frame header in the first BPV can continue until all unique versions of the frame that are required are represented.

As can be seen, MFPV 400, FPV 402, BPVs 404–410, and graphical representation of pointers 412–418 have been reproduced from FIG. 4. The foregoing cited elements function in FIG. 5 as was described in relation to FIG. 4.

In addition to the foregoing, since it has been determined that the frame is to be multicast, and that the headers of one or more the frames to be multicast are to be somewhat different than that of the frame received, there is need for one or more unique frames. Accordingly, shown in FIG. 5 is that m (where m is some positive integer) FPVs have been created, where each FPV will be used to generate unique frames as described following.

Shown in FIG. 5 is second FPV 500 associated with MFPV 400. Second FPV 500 has a parent pointer field, graphically illustrated as pointer 504, which points to MFPV 400 with which second FPV 500 is associated; second FPV 500 also has a first $BPV_2$ data structure field, graphically illustrated as pointer 506, which points to first $BPV_2$ 502. First $BPV_2$ 502 has a next BPV field, graphically illustrated as pointer 508, which points to second BPV 406; first $BPV_2$ 502 also has an FB-PTR (Frame Buffer-Pointer) field (not shown) which points to the location where the actual portion (in this instance, that portion being the header) of a received frame, associated with first $BPV_2$ 502, is stored (the FB-PTR field allows a BPV to be used to manipulate actual received frame contents).

Since it has been determined that the header of the received data frame, associated with first $BPV_2$ 502, is to be modified, the FP-PTR field of first $BPV_2$ 502 can be utilized to manipulate the header independent of the rest of the frame.

Shown in FIG. 5 is $m^{th}$ FPV 520 associated with MFPV 400. $M^{th}$ FPV 520 has a parent pointer field, graphically illustrated as pointer 524, which points to MFPV 400 with which $m^{th}$ FPV 520 is associated; $m^{th}$ FPV 520 also has an $m^{th}$ BPV$_m$ data structure field, graphically illustrated as pointer 526, which points to First BPV$_m$ 522. First BPV$_m$ 522 has a next BPV field, graphically illustrated as pointer 528, which points to second BPV 406; First BPV$_m$ 522 also has an FB-PTR (Frame Buffer-Pointer) field (not shown) which actually points to the location where the actual portion (in this instance, that portion being the header) of a received frame, associated with first BPV$_m$ 522, is stored (the FB-PTR field allows a BPV to be used to manipulate actual received frame contents).

Since it has been determined that the header of the received data frame, associated with first BPV$_m$ 522, is to be modified, the FP-PTR field of first BPV$_m$ 522 can be utilized to manipulate the header independent of the rest of the frame.

FIG. 5 illustrates how the present invention constructs a multicast frame representation of m unique frames. It can be seen from FIG. 5 how the present invention decreases storage requirements, in that the use of the defined pointers allows unique frames to be constructed by creating copies and manipulating only the header of the received frame, and then using the remaining pointer structures to be used to construct the rest of the data frame. Thus, after a unique header has been defined, the remaining pointer structure, as is shown in FIG. 5, can be utilized to construct the rest of a unique frame. After each unique version of the frame is created, the transmit frame I/O logic 308 can be instructed to transmit the frames to the appropriate ports.

Figure 6:
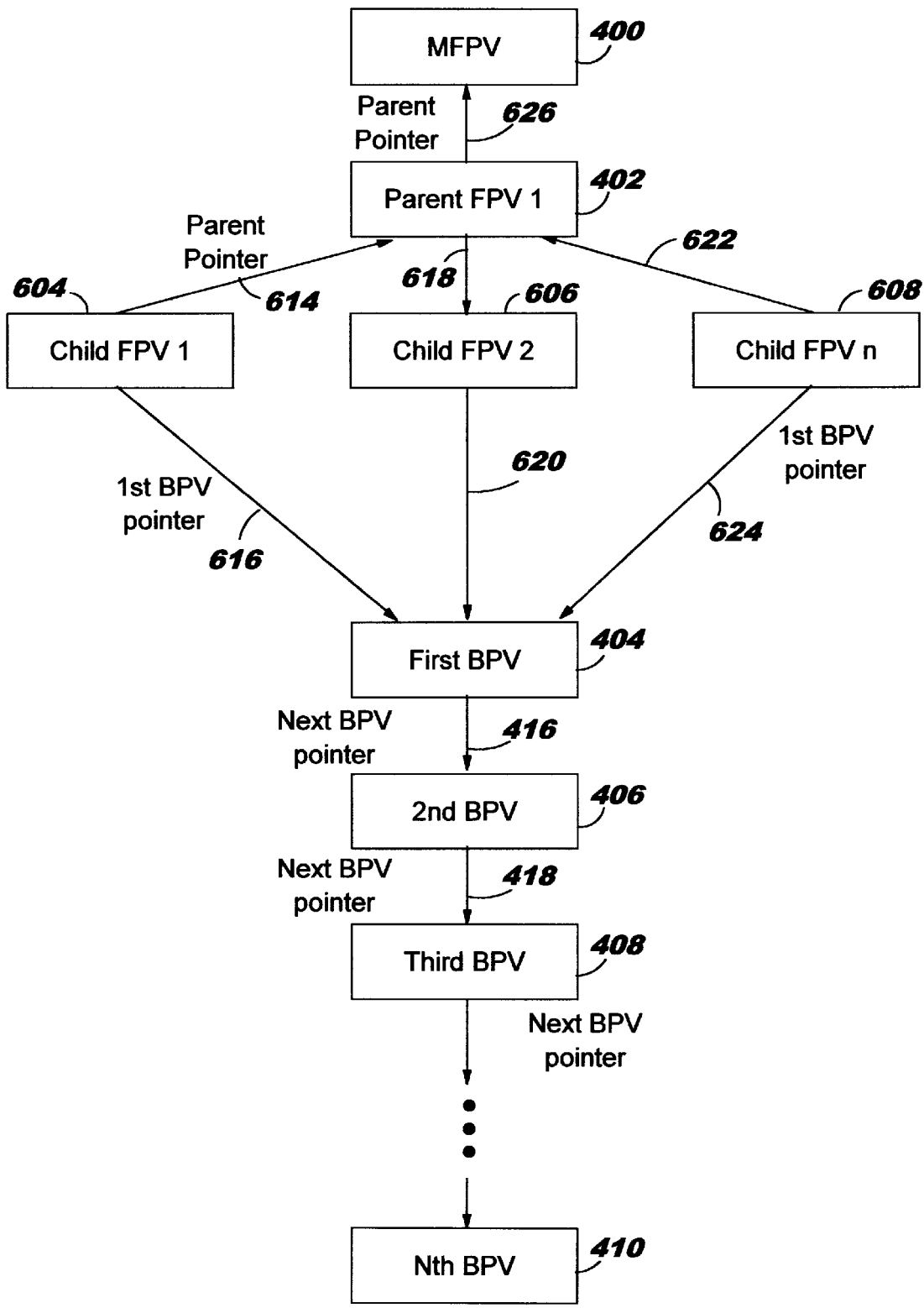
FIG. 6 illustrates how the present invention constructs multicast frames with multiple copies of the same frame header in accord with an illustrative embodiment of the present invention.

Refer now to FIG. 6. FIG. 6 illustrates how the present invention constructs multicast frames with multiple copies of the same frame header in accord with an illustrative embodiment of the present invention.

In the event that, when a frame is received, the protocol processing logic 304 determines that a frame is to be multicast, and that the frame header need not be modified, it will be necessary to create multicast frames with multiple copies of the same frame header. That is, in an illustrative embodiment of the present invention, the protocol processing logic will determine that a particular unique version of an inbound frame must have exact replications of that frame. In this case, after the protocol processing logic 304 and the unicast/multicast solution logic 306 have created the unique version of the frame, the protocol processing logic can inform the unicast/multicast solution logic 306 that the version of the frame is to be replicated and sent to multiple output ports. The protocol processing logic does this by associating the frame with an entry in the Multicast Group Table (MGT).

For each bit set in the entry an entry of the MGT, the multicast/unicast solution logic 306 will create an exact replication of the frame. The multicast/unicast solution logic 306 does this by creating a new Child FPV for each copy of the frame that needs to exist. In one illustrative embodiment of the present invention, each unique received data frame is represented by a unique MFPV-Parent FPV pair, thus, shown in FIG. 6 is MFPV 400 paired with parent FPV 402. Parent FPV 402 has parent pointer field, graphically illustrated as pointer 626, which points to MFPV 400 with which FPV 402 is associated.

Since in this case, n (where n represents some positive integer) exact replicas of the unique received data frame are to be created, shown in FIG. 6 is that n child FPVs 604, 606, and 608 are created. Each of the n child FPVs 604, 606, and 608, has a parent pointer field, graphically illustrated as pointers 614, 618, and 622 respectively, which points to Parent FPV 402 with which each of the n child FPVs 604, 606, and 608 is associated; each of the n child FPVs 604, 606, and 608 also has a first BPV data structure field, graphically illustrated as pointers 616, 620, and 624, which points to first BPV 404. First BPV 404 has a next BPV field, graphically illustrated as pointer 416, which points to second BPV 406; first BPV 404 also has an FB-PTR (Frame Buffer-Pointer) field (not shown) which actually points to the location where the actual portion of a received frame, associated with first BPV 404, is stored (the FB-PTR field allows a BPV to be used to manipulate actual received frame contents). It should be noted that this method and system require virtually no additional storage other than that originally (excepting the storage necessary for the FPVs) necessary for the unicast frame.

As can be seen in FIG. 6, BPVs 404–410, and graphical representation of pointers 416–418 have been reproduced from FIG. 4. The foregoing cited elements function in FIG. 6 as was described in relation to FIG. 4.

After the illustrated Child FPVs have been created, the transmit frame I/O logic 308 can be instructed to transmit the frames to the appropriate ports.

Figure 7:
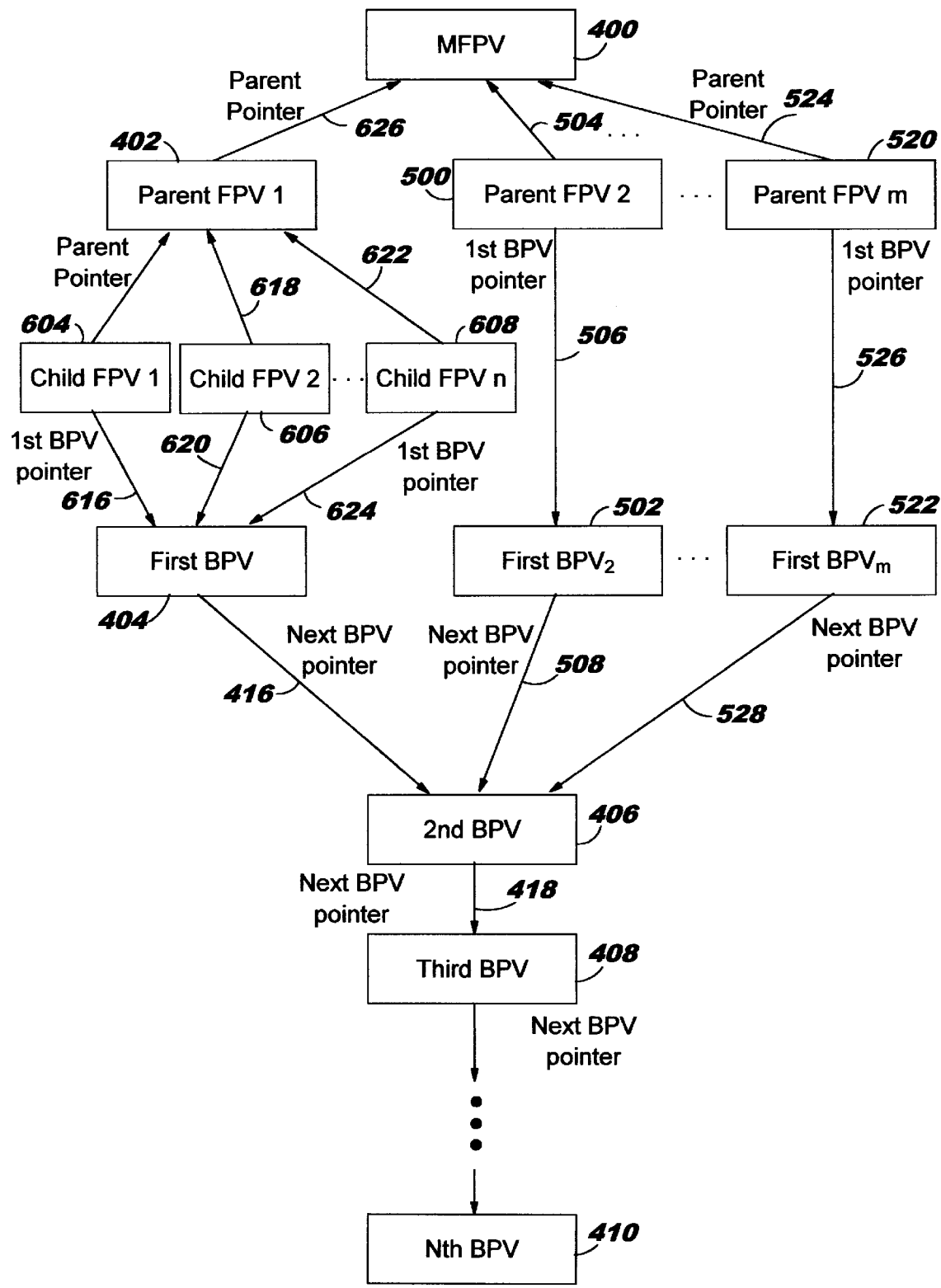
FIG. 7 illustrates how combinations of multicast frames with unique headers and multiple copies of the same header are handled in an illustrative embodiment of the present invention.

Refer now to FIG. 7, FIG. 7 illustrates how combinations of multicast frames with unique headers and multiple copies of the same header are handled in an illustrative embodiment of the present invention. Using the methods described previously, all combinations of frames with unique headers and multiple copies of the same frame can be created. This is performed by first creating all copies of the multicast frames with unique headers, then assigning each copy to an entry in the MGT.

FIG. 7 illustrates a multicast frame representation of m unique frames and n copies of a frame number 1 in accord with an illustrative embodiment of the present invention. In FIG. 7, m (where m is some positive integer) unique frames have been created, and frame number 1 has been assigned to an entry in the MGT resulting in several copies of that frame, with the same header, being created.

FIG. 7 is basically a composite of portions of FIGS. 5 and 6. As can be seen, MFPV 400, Parent FPV 402, n Child FPVs 604–608, and graphical representation of pointers 612–626 have been reproduced from FIG. 6. The foregoing cited elements function in FIG. 7 as was described in relation to FIG. 6.

Also as can be seen, MFPV 400, second FPV 500, and $m^{th}$ FPV 520, first BPV$_2$ 502, first BPV$_m$522, and graphical representation of pointers 504, 506, 524, and 526 have been reproduced from FIG. 5. The foregoing cited elements function in FIG. 7 as was described in relation to FIG. 5.

Lastly as can be seen in FIG. 7, BPVs 404–410, and graphical representation of pointers 416–418 have been reproduced from FIG. 4. The foregoing cited elements function in FIG. 7 as was described in relation to FIG. 4.

Thus, FIG. 7 illustrates how multicasting wherein both unique frames and exact replicas of frames can be achieved in one illustrative embodiment of the present invention.

Figure 8:
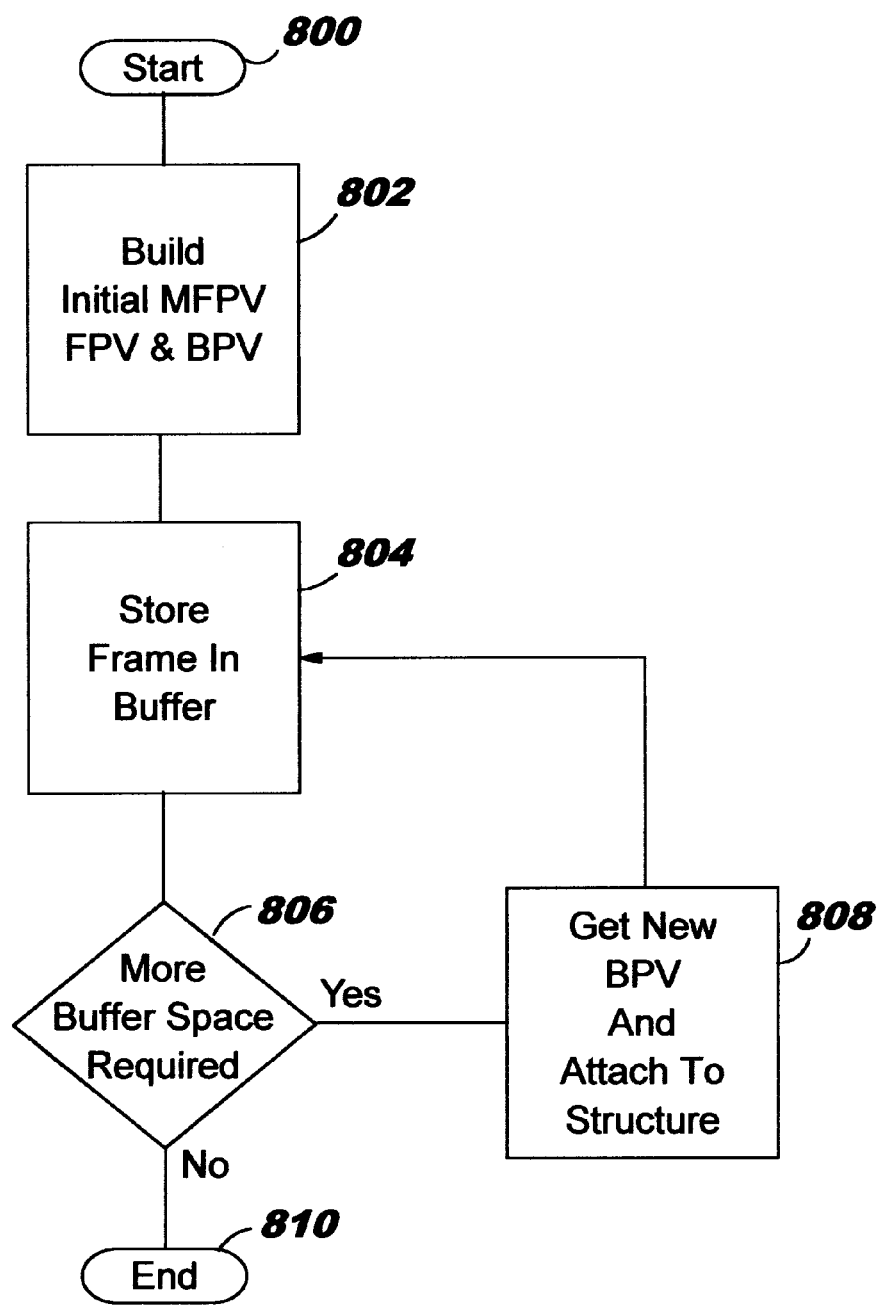
FIG. 8 depicts a high level logic flowchart showing the receive flow process whereby a frame is built in accord with an illustrative embodiment of the present invention.

Refer now to FIG. 8. FIG. 8 depicts a high level logic flowchart showing the receive flow process whereby a frame is built in accord with an illustrative embodiment of the present invention. Method step 800 depicts the start of the process. Method step 802 illustrates the building of an initial MFPV, FPV, and BPV for a received frame by computational equipment associated with a network node where the present illustrative embodiment is illustrated.

Thereafter, method step 804 shows the storing of the received frame in a buffer (storage location); the amount of the received frame that can be stored will be dependent upon the size of the buffer, and if the frame is larger than the storage location, the portion of the frame that will fit is stored in the buffer.

Thereafter, method step 806 depicts a determination of whether more buffer space is required; that is, method whether all of the received frame has been stored or whether a portion remains that has yet to be stored.

In the event that more buffer space is required, then the process proceeds to method step 808 which depicts the creation of a new BPV, which is attached to all, or a portion, of the structure of a size sufficient to fit within the available buffer space. (The BPV is utilized to chain together the portions of the received frame, as was discussed above). Thereafter, the process proceeds to method step 804 wherein the portion is stored.

The 804–806–808 loop continues until the received data structure has been completely stored. Once the data structure has been completely stored, then the inquiry depicted in method step 806 yields the result that no more buffer space is required. Consequently, the process proceeds to method step 810 and stops.

Figure 9:
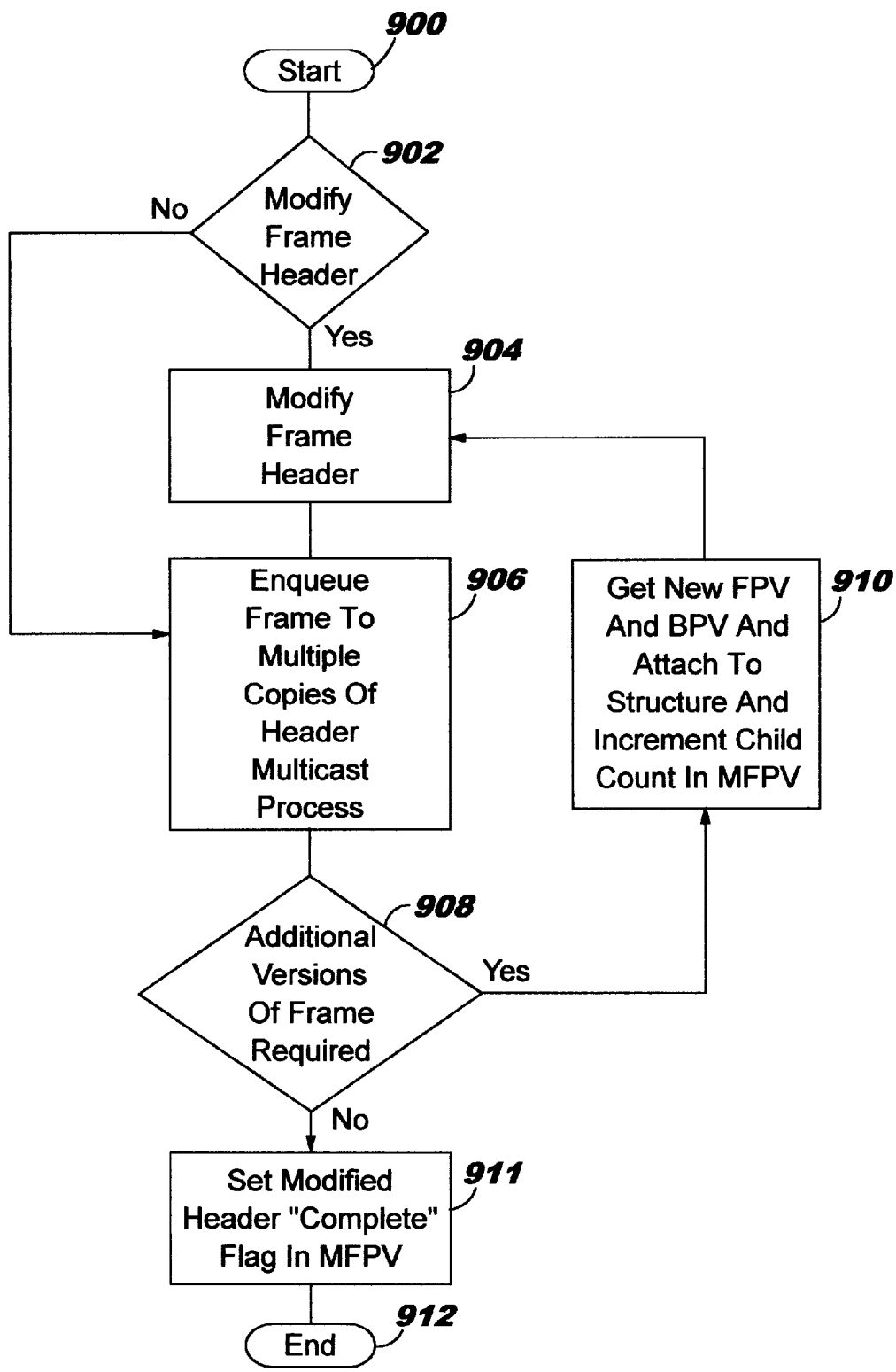
FIG. 9 depicts a high level logic flowchart showing the unique header multicast process whereby multiple unique header frames are built in accord with an illustrative embodiment of the present invention.

Refer now to FIG. 9. FIG. 9 depicts a high level logic flowchart showing the unique header multicast process whereby multiple unique header frames are built in accord with an illustrative embodiment of the present invention. Method step 900 depicts the start of the process. Method step 902 illustrates that, subsequent to the reception of and storing of a frame as was illustrated in FIG. 9, a determination is made as to whether or not a received frame will need to have its header modified.

If it is determined that the header will need to be modified, the process proceeds to method step 904 wherein it is shown that the header is modified as necessary. Subsequently, the process proceeds to method step 906 wherein a copy of the received frame is enqueued, or matched with, the modified header. Thereafter, the process proceeds to method step 908 wherein it is depicted that a determination of whether additional versions of the frame will be required (e.g., a multicast operation is indicated by the received frame).

In the event that the inquiry depicted in method step 908 indicates that additional frames are necessary, the process proceeds to method step 910 wherein it is shown that new copies of the received (unmodified) frame are produced in that new FPV and BPV are created and utilized, in the manner set forth above, to produce a new and unique copy of the received frame and also shown is that the Child Count field in the MFPV is incremented. Subsequent to the production of the new and unique copy, the process proceeds to method step 904, wherein any requisite modification to the frame header is done. Thereafter, a copy of the received frame is produced and paired with the modified header as is depicted in method step 906.

The 904–906–908–910 loop continues until all requisite copies of frames and their attendant headers have been produced, after which the inquiry depicted in method step 908 will yield the determination that no additional versions of the received frame are required at which point the process will proceed to method step 911. Thereafter, the process proceeds to method step 912 and stops.

If from the inquiry depicted in method step 902, it is determined that the header will not need to be modified, the process proceeds to method step 906 wherein a copy of the received frame is enqueued, or matched with, the unmodified header. Thereafter, the process proceeds to method step 908 wherein it is depicted that a determination of whether additional versions of the frame will be required (e.g., a multicast operation is indicated by the received frame).

If additional versions of the received frame are required, then the process proceeds to method step 910 and continues from that point as discussed above. Otherwise, the process proceeds to method step 911 wherein it is demonstrated that a modified header "complete" flag is set. (Because one embodiment of the present invention is hardware, the processes of constructing frames and freeing data structures (discussed below in relation to FIG. 11) are decoupled; consequently, a mechanism is needed to ensure that all necessary frames are constructed before data structures associated with the constructed frames are freed up for other uses.) Otherwise, the process proceeds to method step 912 and stops.

Figure 10:
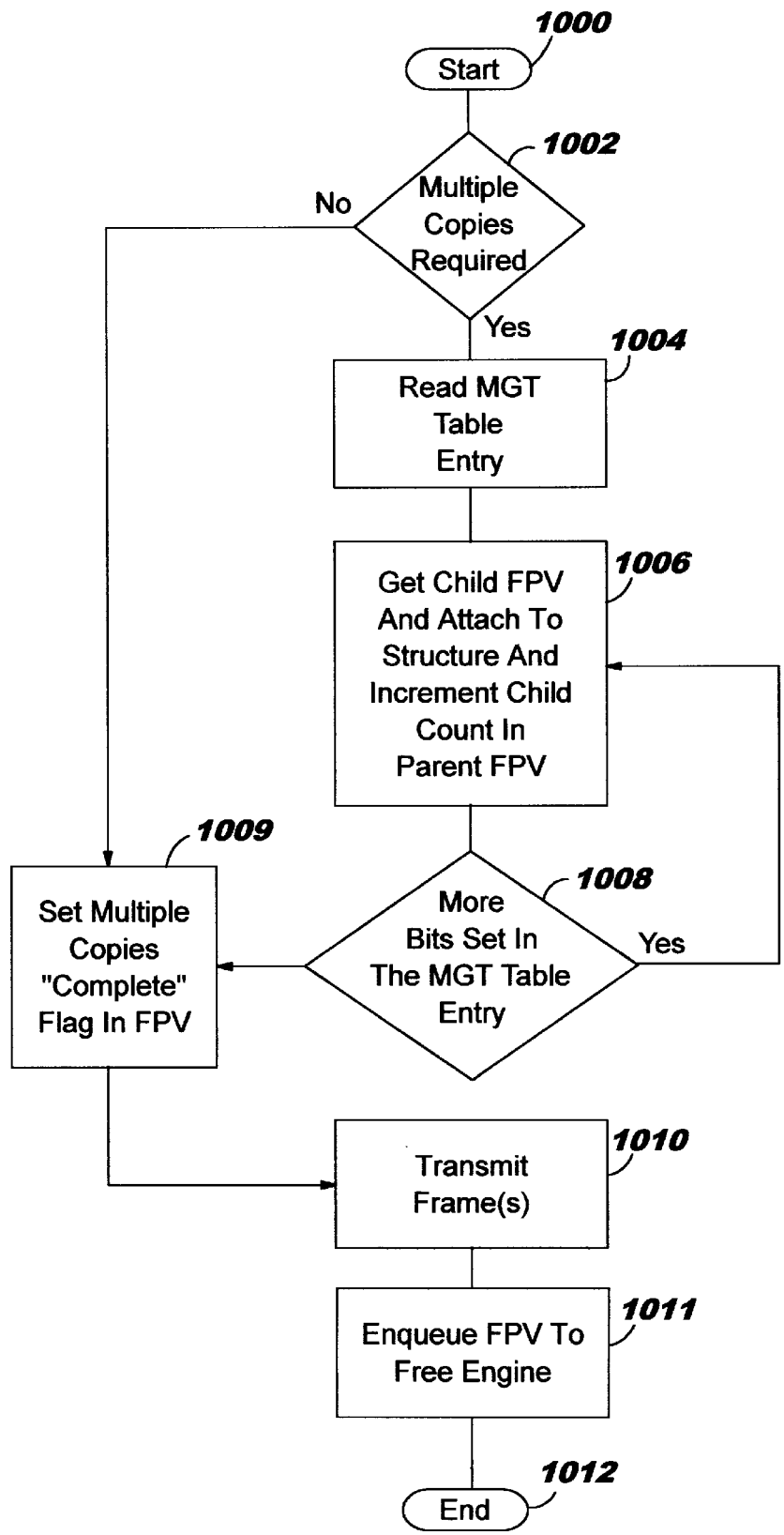
FIG. 10 depicts a high level logic flowchart showing how multiple copies of identical frames are built in accord with an illustrative embodiment of the present invention.

Refer now to FIG. 10. FIG. 10 depicts a high level logic flowchart showing how multiple copies of identical header frames are built in accord with an illustrative embodiment of the present invention. Method step 1000 shows the start of the process. Method step 1002 show an inquiry as to whether multiple copies are required of a received frame; typically this is determined by reading the header on the frame and determining whether or not it is indicative of multicast.

In the event that it is determined that multiple copies of a received frame are required, the process proceeds to method step 1004 wherein it is depicted the MGT table entry correspondent to the group associated with the received frame header is read. Thereafter, method step 1006 illustrates that a child FPV, associated with the first port in the MGT table from which the frame is to be transmitted, is obtained and attached to the frame. Thereafter, the process proceeds to method step 1008 wherein it is shown that a determination is made as to whether more bits are set (i.e., which ports are indicated) in the MGT table entry (that is, whether the frame needs to be transmitted from more ports).

If it is determined that more bits are set (i.e., which ports are indicated), the process proceeds to method step 1006 which illustrates the generation of an FPV, indicative of the correct port indicated in the MGT, and attachment of that FPV to a copy of the frame; also illustrated is that the Child Count field is incremented within the Parent FPV.

The 1006–1008 loop continues until all necessary copies of correctly addressed frames have been produced sufficient to satisfy the multicast group defined by the MGT entry under consideration, after which the process proceeds to method step 1009. Method step 1009 depicts that a multiple copies "complete" flag is set. (Because one embodiment of the present invention is hardware, the processes of constructing frames and freeing data structures (discussed below in relation to FIG. 11) are decoupled; consequently, a mechanism is needed to ensure that all necessary frames are constructed before data structures associated with the constructed frames are freed up for other uses.)

Method step 1010 depicts the transmission of the multicast frames, out of the network nodes via the appropriate ports represented by the created FPVs. This is achieved by putting each frame on its corresponding output queue for transmission; in the event that one or more such output queues are not available for transmission, the corresponding FPV is temporarily placed into an "free" queue, and the remaining frames that can be transmitted out of the node are transmitted out of the node.

Thereafter, method step 1011 illustrates that the one or more enqueued FPVs are subsequently used to transmit the remaining frames from the node as the corresponding output queues become available. Thereafter, the process proceeds to method step 1012 and stops.

In the event that it is determined, in the inquiry depicted in method step 1002, that multiple copies of a received frame are not required, the process proceeds to method step 1009 which depicts that a multiple copies "complete" flag is set. (Because one embodiment of the present invention is hardware, the processes of constructing frames and freeing data structures (discussed below in relation to FIG. 11) are decoupled; consequently, a mechanism is needed to ensure that all necessary frames are constructed before data structures associated with the constructed frames are freed up for other uses.) Thereafter, the process proceeds to method step 1010 which depicts the transmission of the frame, out of the network node. Thereafter, the process proceeds to method step 1012 and stops.

Figure 11:
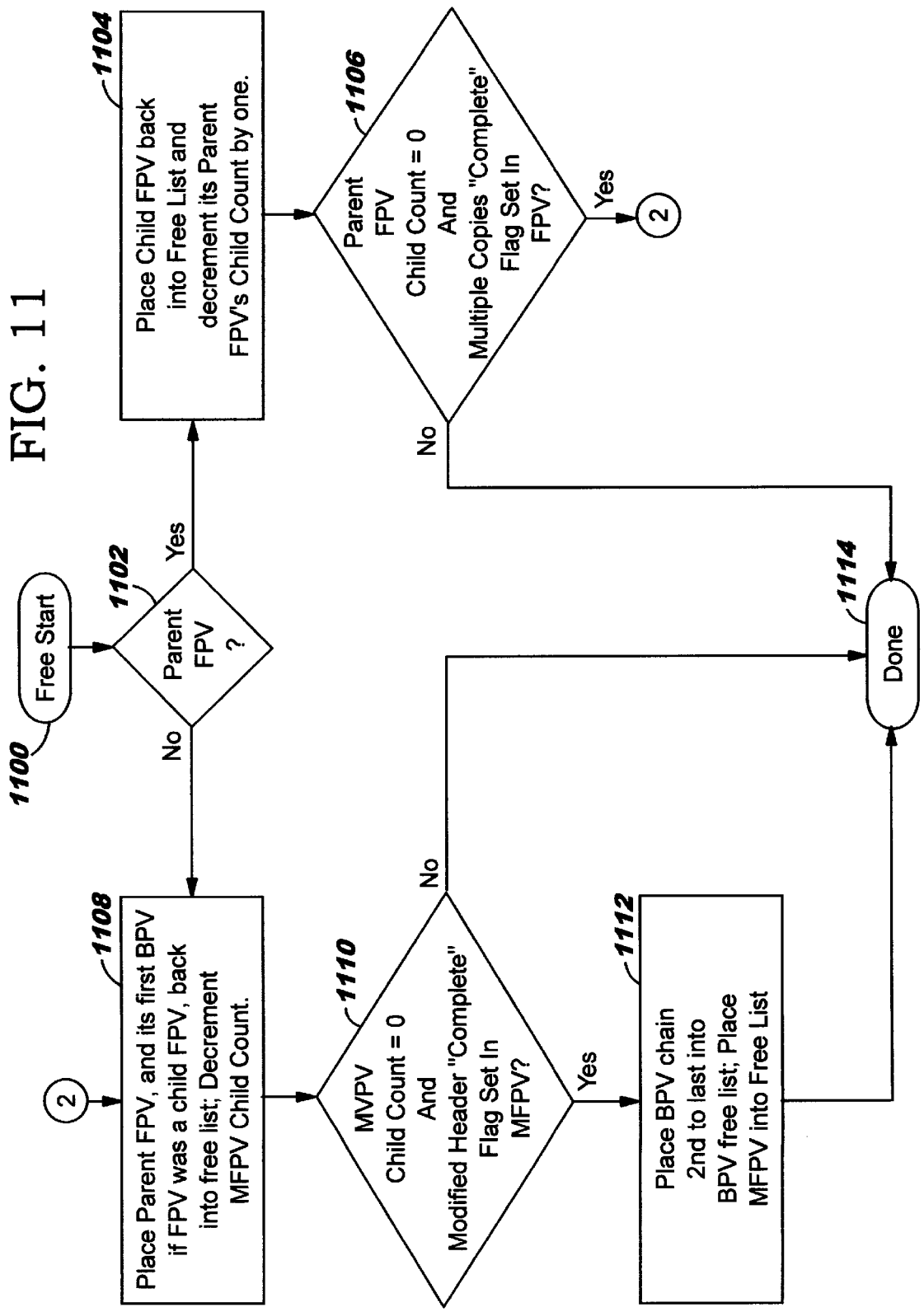
FIG. 11 is a high level logic flowchart illustrating how the data structures which were created to achieve frame multicasting are freed after the multicast frame has been transmitted from the node.

Refer now to FIG. 11. FIG. 11 is a high level logic flowchart illustrating how the data structures which were created to achieve frame multicasting are freed after the multicast frame has been transmitted from the node. Method step 1100 shows the start of the process. Method step 1102 depicts the inquiry of whether the FPV associated with the frame just transmitted from the node had a parent FPV (via use of the "parent type" flag in the "flag" field of the FPV); in the event that the inquiry indicates the FPV of the frame just transmitted had a parent FPV, then the process proceeds to method step 1104, wherein it is illustrated that the child FPV is placed back into the free list, and that the child count associated with the parent FPV, associated with the child FPV just placed back into the free list, is decremented by one. Thereafter, the process proceeds to method step 1106 which depicts the inquiry as to whether the FPV child count associated with the parent FPV detected in method step 1102 is equal to zero and whether the multiple copies "complete" flag is set in the FPV. In the event that both the count is equal to zero and that the multiple copies "complete" flag is set, then the process proceeds to method step 1108.

At this point, since it is known that the child count for the FPV is zero, both the FPV and the first BPV associated with the FPV can be retired; that is, as is shown in method step 1108, both the parent FPV and its first BPV (if the FPV was a child) are placed back in the free list; thereafter, the MFPV child count associated with the parent FPV is decremented by one. Subsequently, the process proceeds to method step 1110 wherein it is shown to be determined whether the MFPV count is equal to zero and whether the modified header "complete" flag associated with the MFPV is set. In the event that both the MFPV child count is determined to be zero and that the modified header "complete" flag is set, then the process proceeds to method step 1112, wherein it is shown that the BPV chain second to last is placed into the BPV free list and that the MFPV is placed into the free list. Thereafter, the process proceeds to method step 1114, where it is illustrated that the freeing up of the data structures, associated with the frame that was just transmitted from the node, is ceased.

In the event that the inquiry shown in method step 1106 determines that the parent FPV associated with the child FPV placed back into the free list as was illustrated in method step 1104 has a child count that is not equal to zero or that the multiple copies "complete" flag is not set, the process proceeds to method step 1114, wherein it is illustrated that the freeing up of the data structures, associated with the frame that was just transmitted from the node, is completed.

In the event that the inquiry depicted in method step 1110 yields the determination that the MFPV child count is not equal to zero or that the modified header "complete" flag is not set, then the process proceeds to method step 1114, wherein it is depicted that the freeing up of the data structures, associated with the frame just transmitted from the node, is completed.

It is to be understood that the method, or flow, depicted in FIG. 11 is to be engaged in for every occurrence of a frame leaving a node.

Figure 12:
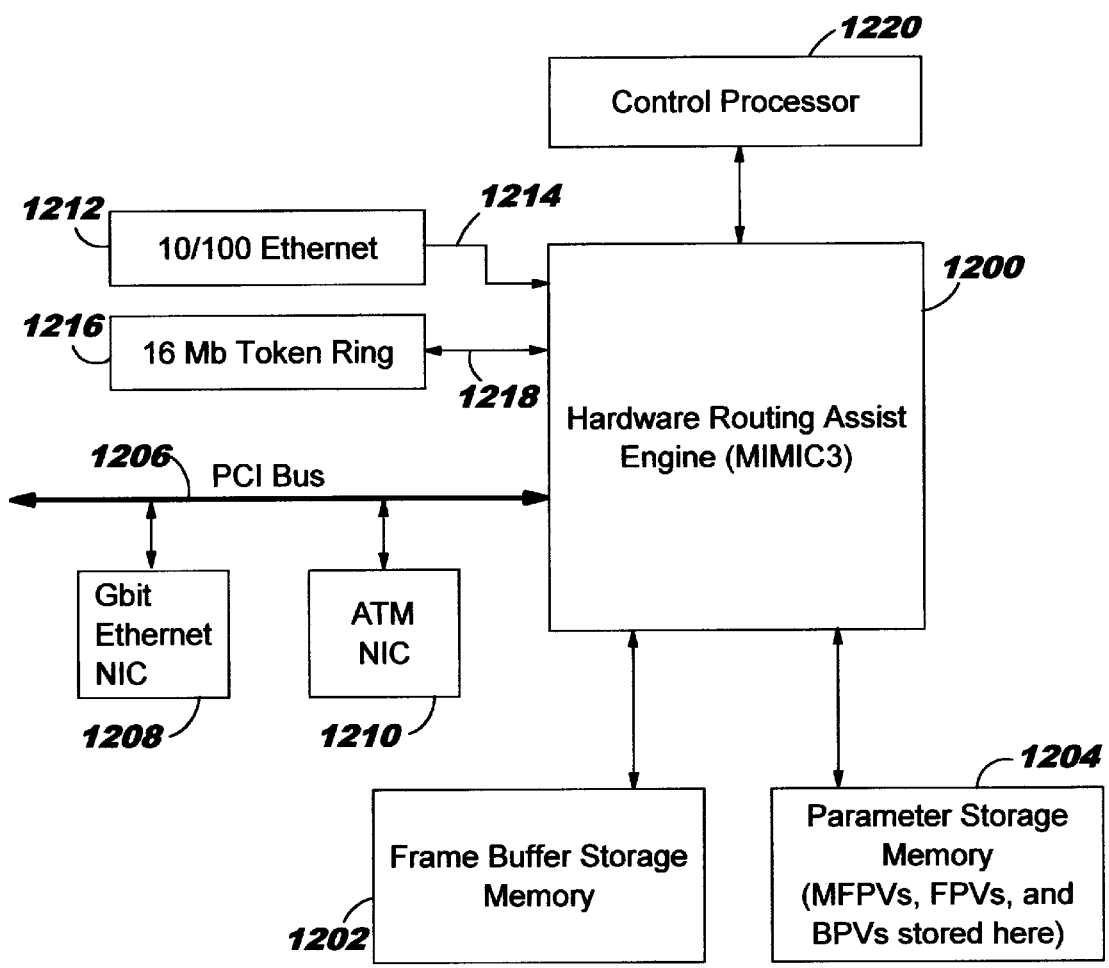
FIG. 12 is a high level block diagram of a communication system for implementing an illustrative embodiment of the present invention.

FIG. 12 is a high level block diagram of a communication system for implementing an illustrative embodiment of the present invention. Depicted in FIG. 12 is hardware routing assist engine 1200, which can be implemented in an Application Specific Integrated Circuit (ASIC) by utilizing hardware description language (HDL) in a manner well known to those with the art; also shown is frame buffer storage memory 1202, parameter storage memory 1204 which can be implemented with any of a number of storage devices (such as DRAM) well known to those in the art. With respect to the FIG. 3 hardware, as was discussed above, frame buffer storage memory 1202 and parameter storage memory 1204 collectively make up what was represented as frame memory 300 in FIG. 3. The remaining aspects of FIG. 3 are encompassed within hardware routing assist engine 1200 in FIG. 12. All functionality and activities of the preceding discussed data structures as depicted in FIGS. 4, 5, 6, and 7 and preceding described flowcharts as depicted in FIGS. 8, 9, 10, and 11 are implemented in hardware routing assist engine 1200 by state machines acting in conjunction with frame buffer storage memory 1202 and parameter storage memory 1204.

Connected to hardware routing assist engine 1200 is PCI (peripheral component interconnect) bus 1206 which has slots to accept giga-bit ethernet network interface card 1208 and ATM (asynchronous transfer mode) network interface card 1210. Also shown in FIG. 12 is a 10/100 ethernet 1212 which connects to hardware routing assist engine 1200 via bus 1214 and 16 megabyte token ring 1216 which connects to hardware routing assist engine 1200 via bus 1218. Also shown is that control processor 1220 (which could be implemented via use of any number of processors, such as a microprocessor, well known to those within the art) is connected to and controls the operation of hardware routing assist engine 1200.

As can be seen from FIG. 12, hardware routing assist engine 1200, under the control of control processor 1220, receives different types of data frames. For example, hardware routing assist engine 1200 receives giga-bit ethernet protocol data frames from giga-bit ethernet network interface card 1208 via PCI bus 1206. Hardware routing assist engine 1200 also receives ATM protocol frames from ATM network interface card 1210 via PCI bus 1206. In addition, hardware routing assist engine 1200 receives 10/100 ethernet protocol data frames and 16 mega-bit token ring protocol data frames via buses 1214 and 1218, respectively. Consequently, to do multicast/unicast effectively, hardware routing assist engine 1200 must be able to quickly and effectively duplicate, modify, and replicate data frame headers and data as appropriate to both the origin and destination of any frame received. Such can be done by the hardware routing assist engine 1200, acting under the control of control processor 1220, because hardware routing assist engine 1200 can be an ASIC designed to provide the method and system set forth in the previous data structures and flowcharts to ensure that multicast/unicast is achieved in an efficient fashion.

While the invention has been particularly shown and described with reference to a preferred embodiment, it will be understood by those skilled in the art that various changes in form and detail may be made therein without departing from the spirit and scope of the invention. Specifically, while a hardware implementation has been described, it will be understood that the invention can be implemented in software, firmware, or any combination of hardware, software, or firmware. Furthermore, it will also be understood by those within the art that such implementations could be embodied within program products, which include but are not limited to programs fixed in some signal bearing media such as transmission media (e.g., web pages, bulletin boards, telnet sites, etc.) or recordable media (e.g., magnetic floppy disk, digital tape, CD ROM, etc.)

What is claimed is:

1. A method for increasing processing efficiency associated with data frames transiting a network node having multiple ports, said method comprising the steps of:
   receiving a data frame having a header and data;
   creating a number of pointers necessary to construct a requisite number of data frames from copies of said received data frame;
   creating one or more data frames from said received data frame utilizing said created number of pointers;
   providing one or more associated pointers for said one or more created data frames; and
   modifying each of said one or more created data frames independent of other created data frames via utilization of a given one of said associated pointers.

2. The method of claim 1, wherein said providing step further comprises the steps of:
   segmenting said received data frame into parts, wherein each of said parts corresponds to a created data frame; and
   providing an associated pointer for each of said segmented part.

3. The method of claim 1, further comprising the steps of:
   determining what type of transmission said received header indicates;
   in response to said determined transmission type, constructing a number of data frames, commensurate with protocols and destination addresses of one or more network nodes to which said constructed number of data frames is to be transmitted, by utilizing said provided pointers; and
   transmitting said constructed data frames from said node.

4. The method of claim 2, further comprising the step of constructing a copy of a portion of said received data frame by recalling each of said segmented part associated with one or more selected ones of said associated pointers.

5. The method of claim 3, wherein said step of constructing further comprises the steps of:
   creating a requisite number of headers, utilizing a subset of said created number of pointers, commensurate with protocols and destination addresses of one or more network nodes to which said received data frame is to be transmitted; and
   pairing said created requisite number of headers with said requisite number of data frames from copies of said received data frame.

6. The method of claim 3, wherein said step of determining further comprises the step of distinguishing between unicast and multicast on the basis of said received header.

7. A system for increasing processing efficiency associated with data frames transiting a network node having multiple ports, said system comprising:
   means for receiving a data frame having a header and data;
   means for creating a number of pointers necessary to construct a requisite number of data frames from copies of said received data frame;
   means for creating one or more data frames from said received data frame utilizing said created number of pointers;
   means for providing one or more associated pointers for said one or more created data frames; and
   means for modifying each of said one or more created data frames independent of other created data frames via utilization of a given one of said associated pointers.

8. The system of claim 7, wherein said means for providing further comprises:
   means for segmenting said received data frame into parts, wherein each of said parts corresponds to a created data frame; and
   means for providing an associated pointer for each of said segmented part.

9. The system of claim 7, further comprising:
   means for determining what type of transmission said received header indicates;
   means, responsive to said determined transmission type, for constructing a number of data frames, commensurate with protocols and destination addresses of one or more network nodes to which said constructed number of data frames is to be transmitted, by utilizing said provided pointers; and
   means for transmitting said constructed data frames from said node.

10. The system of claim 8, further comprising means for constructing a copy of a portion of said received data frame by recalling each of said segmented part associated with one or more selected ones of said associated pointers.

11. The system of claim 9, wherein said means for constructing further comprises:
   means for creating a requisite number of headers, utilizing a subset of said created number of pointers, commensurate with protocols and destination addresses of one or more network nodes to which said received data frame is to be transmitted; and
   means for pairing said created requisite number of headers with said requisite number of copies of said received data frame.

12. The system of claim 9, wherein said means for determining further comprises means for distinguishing between unicast and multicast on the basis of said received header.

13. A program product for increasing processing efficiency associated with data frames transiting a network node having multiple ports, said program product comprising:
   means for receiving a data frame having a header and data;
   means for creating a number of pointers necessary to construct a requisite number of data frames from copies of said received data frame;
   means for creating one or more data frames from said received data frame utilizing said created number of pointers;
   means for providing one or more associated pointers for said one or more created data frames;
   means for modifying each of said one or more created data frames independent of other created data frames via utilization of a given one of said associated pointers; and signal bearing media bearing said means for receiving, both of said means for creating, said means for providing, and said means for modifying.

14. The program product of claim 13 wherein said signal bearing media comprises transmission media.

15. The program product of claim 13, wherein said means for providing further comprises:

means for segmenting said received data frame into parts, wherein each of said parts corresponds to a created data frame; and means for providing an associated pointer for each of said segmented part.

16. The program product of claim 13, further comprising:

means for determining what type of transmission said received header indicates;

means, responsive to said determined transmission type, for constructing a number of data frames, commensurate with protocols and destination addresses of one or more network nodes to which said constructed number of data frames is to be transmitted, by utilizing said provided pointers; and means for transmitting said constructed data frames from said node.

17. The program product of claim 15, further comprising means for constructing a copy of a portion of said received data frame by recalling each said segmented part associated with one or more selected ones of said associated pointers.

18. The program product of claim 16, wherein said means for constructing further comprises:

means for creating a requisite number of headers, utilizing a subset of said created number of pointers, commensurate with protocols and destination addresses of one or more network nodes to which said received data frame is to be transmitted; and means for pairing said created requisite number of headers with said requisite number of copies of said received data frame.

19. The program product of claim 16, wherein said means for determining further comprises means for distinguishing between unicast and multicast on the basis of said received header.

20. A method for increasing processing efficiency associated with data frames transiting a network node having multiple ports, said method comprising the steps of:

receiving a data frame having a header and data;

creating a number of pointers necessary to construct a requisite number of data frames from copies of said received data frame;

creating a requisite number of headers, utilizing a subset of said created number of pointers, commensurate with protocols and destination addresses of one or more network nodes to which said received data frame is to be transmitted;

creating one or more data frames from said received data frame utilizing said created number of pointers, in conjunction with said associated pointers, to pair said created requisite number of headers with said requisite number of data frames from copies of said received data frame;

providing one or more associated pointers for said one or more created data frames; and modifying each of said one or more created data frames independent of other created data frames via utilization of a given one of said associated pointers.

* * * * *